US010505916B2

(12) United States Patent
Engan et al.

(10) Patent No.: US 10,505,916 B2
(45) Date of Patent: Dec. 10, 2019

(54) AUTHENTICATION TOKEN WITH CLIENT KEY

(71) Applicant: T-Mobile USA, Inc., Bellevue, WA (US)

(72) Inventors: Michael Engan, Bellevue, WA (US); Douglas McDorman, Sammamish, WA (US); Senthil Kumar Mulluppadi Velusamy, Redmond, WA (US); Komethagan Subramaniam, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 34 days.

(21) Appl. No.: 15/788,731

(22) Filed: Oct. 19, 2017

(65) Prior Publication Data

US 2019/0124070 A1    Apr. 25, 2019

(51) Int. Cl.
| | |
|---|---|
| *H04L 29/06* | (2006.01) |
| *H04L 9/32* | (2006.01) |
| *H04W 12/06* | (2009.01) |
| *H04W 12/00* | (2009.01) |

(52) U.S. Cl.
CPC ........ *H04L 63/0807* (2013.01); *H04L 9/3247* (2013.01); *H04L 63/0272* (2013.01); *H04L 63/0435* (2013.01); *H04L 63/0442* (2013.01); *H04L 63/061* (2013.01); *H04L 63/0815* (2013.01); *H04W 12/0609* (2019.01); *H04L 63/10* (2013.01); *H04L 63/166* (2013.01); *H04W 12/001* (2019.01)

(58) Field of Classification Search
None
See application file for complete search history.

(56) References Cited

U.S. PATENT DOCUMENTS

| | | | |
|---|---|---|---|
| 6,668,322 B1 | 12/2003 | Wood et al. | |
| 6,842,863 B1 * | 1/2005 | Fox | H04L 9/3263 |
| | | | 713/156 |

(Continued)

OTHER PUBLICATIONS

The International Search Report and Written Opinion for PCT Application No. PCT/US2018/056157, dated Feb. 7, 2019, 11 pages.

(Continued)

*Primary Examiner* — Maung T Lwin
(74) *Attorney, Agent, or Firm* — Han Santos, PLLC (57) ABSTRACT

Techniques are described for using two tokens to request access to a secure server. The tokens allow the server to verify, without an external call, that the requesting device is one identified in the request and that the requesting device is authorized by a trusted identity provider. A first token is an authentication token issued by the trusted identity provider and including a client device public key. The second token is a proof-of-possession token that is signed by a client device using a client device private key corresponding to the client device public key. The server obtains the client device public key from the authentication token, and then uses the client device public key to validate the proof-of-possession token. The authentication token can be re-used by a server creating its own proof-of-possession token for presentation to a second server to access a secure service on the second server.

10 Claims, 10 Drawing Sheets

(56) References Cited

U.S. PATENT DOCUMENTS

| | | | |
|---|---|---|---|
| 7,711,122 B2* | 5/2010 | Allen | H04L 9/0825 380/277 |
| 7,849,326 B2* | 12/2010 | Chao | G06F 21/445 380/277 |
| 8,601,553 B1 | 12/2013 | Griffin et al. | |
| 8,880,889 B1* | 11/2014 | Ward | H04L 63/0442 705/67 |
| 9,264,902 B1* | 2/2016 | Ward | H04L 63/0442 |
| 9,331,990 B2* | 5/2016 | Le Saint | H04L 9/3247 |
| 9,462,473 B2* | 10/2016 | Ward | H04L 63/0442 |
| 9,947,008 B1* | 4/2018 | Camacho Diaz | G06Q 20/38215 |
| 2006/0168446 A1* | 7/2006 | Ahonen | H04L 9/0822 713/163 |
| 2010/0329464 A1* | 12/2010 | Kerschbaum | G06Q 10/087 380/279 |
| 2013/0031361 A1* | 1/2013 | Fahn | H04L 9/321 713/156 |
| 2013/0219473 A1* | 8/2013 | Schaefer | G06F 21/335 726/4 |
| 2014/0250003 A1 | 9/2014 | Levchin et al. | |
| 2014/0325640 A1 | 10/2014 | Aggarwal et al. | |
| 2015/0113283 A1* | 4/2015 | Corella | G06F 21/32 713/185 |
| 2015/0150109 A1 | 5/2015 | Bocanegra et al. | |
| 2016/0094531 A1* | 3/2016 | Unnikrishnan | G06F 21/30 726/7 |
| 2016/0142409 A1* | 5/2016 | Frei | H04L 63/0884 713/176 |
| 2016/0241405 A1 | 8/2016 | Jeong et al. | |
| 2016/0300223 A1* | 10/2016 | Grey | G06Q 20/3825 |
| 2017/0289197 A1 | 10/2017 | Mandyam et al. | |
| 2018/0219863 A1* | 8/2018 | Tran | H04L 63/10 |

OTHER PUBLICATIONS

M. Jones et al., 'Proof-of-Possession Key Semantics for JSON Web Tokens (JWTs)', IETF RFC 7800, Apr. 1, 2016. See pp. 4-9 and figures 1, 2.

U.S. Appl. No. 15/828,266, Notice of Allowance dated Sep. 24, 2019, 14 pages.

* cited by examiner

AUTHENTICATION TOKEN WITH CLIENT KEY

BACKGROUND

Virtually any major web application that is accessible today uses tokens to authenticate a user requesting access to the application/API. The use of tokens allows a user to access multiple servers after only a single login, rather than having to log into each server that the user attempts to access. But clients have to store and transmit tokens, which means that tokens are susceptible to being stolen and presented to gain unauthorized access to a secure system. Furthermore, such token-based techniques require calls to trusted identity servers to authenticate tokens when they are presented.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Network single sign-on protocols exist that define how a client authentication token can be created by an authorization server (i.e., an identity provider) and eventually delivered to a service provider to validate a user to the service provider. In such a scenario, a client is validated through presentation of the authentication token rather than by use of a user identifier and a password.

Such tokens are "bearer tokens" that can be used by any actor that possesses the authentication token because the service provider doesn't make any additional checks to ensure that the authentication token is being presented by the user to whom it was issued. However, bearer tokens are susceptible to being stolen and replayed by a malicious actor who can thus gain access to a secure system for which it is not authorized to use. The strength of such protocols is only as strong as the ability to prevent a malicious actor from gaining possession and presentation of the authentication token to impersonate a valid user.

The techniques described herein represent an improvement over authentication tokens and usage techniques presently in use. Authentication tokens generated and used according to the techniques described herein include a client public key that is associated with a client to which the authentication token is issued. When a client makes a request to a service provider to access a secure service, the client includes the authorization token and a proof-of-possession (POP) token in the request (also known as a "holder of key" or "HOK" token).

The service provider validates the authorization token with an identity provider public key to obtain the client public key, which the service provider then uses to validate the POP token to confirm that the entity making the request is the entity identified in the request, i.e. that the client making the request is the one that the access token was issued to. If either the authentication token or the POP token is changed (e.g., to insert a different client public key, etc.), then an authorization of the token will fail and the presenter of the token will not be able to fully access the requested service, if at all.

Presently known techniques allow for tracking a TLS/SSL (Transport Layer Security/Secure Sockets Layer) public key used when issuing an authentication token. But such techniques require re-use of the same SSL tunnel that was used to obtain an authentication token. Because the techniques disclosed herein involve a client generating a standalone key (i.e. a client public key), there is not a need to track and re-use the same SSL tunnel. Therefore, processing is more localized, which conserves computing resources and allows for faster processing.

Use of the techniques described herein curtail malicious use of authentication tokens, thus resulting in increased network security. In addition, as a result of validation being self-contained within the service provider request by way of the authentication token and the POP token, it is not necessary for the service provider to make calls to an external authority to validate the requesting entity. Therefore, the techniques reduce computing and network resources needed to provide network security, and provide for faster processing of security services.

The novel techniques presented herein are described in detail, below, with respect to several figures that identify elements and operations used in systems, devices, methods, computer-readable storage media, etc. that implement the techniques.

Example Network Architecture

Figure 1:
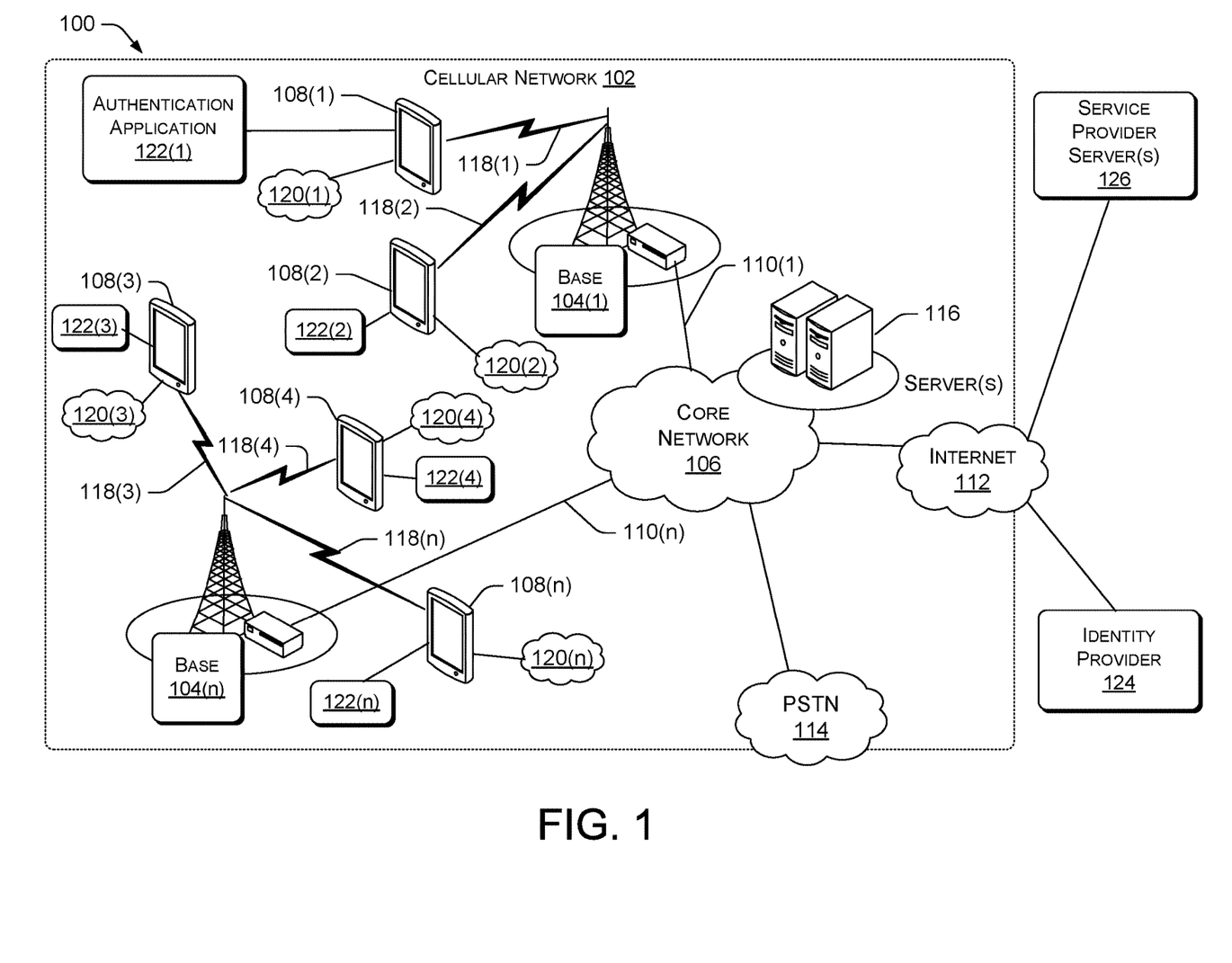
FIG. 1 illustrates an example network architecture for implementing the technology described herein.

FIG. 1 illustrates an example network architecture 100 for implementing the technology described herein, namely, systems and methods for creation and use of authentication tokens with client public keys. Although the network architecture 100 is shown as comprising a cellular network system, it is noted that in one or more implementations, the present techniques can be applied to a network architecture that does not include cellular components.

The network architecture 100 includes a carrier network 102 that is provided by a wireless telecommunication carrier. The carrier network 102 includes cellular network base stations 104(1)-104(n) and a core network 106. Although only two base stations are shown in this example, the carrier network 102 may comprise any number of base stations. The carrier network 102 provides telecommunication and data communication in accordance with one or more technical standards, such as Enhanced Data Rates for GSM Evolution (EDGE), Wideband Code Division Multiple Access (W-CDMA), HSPA, LTE, LTE-Advanced, CDMA-2000 (Code Division Multiple Access 2000), and/or so forth.

The base stations 104(1)-104(n) are responsible handling voice and data traffic between user devices, such as user devices 108(1)-108(n), and the core network 106. Each of the base stations 104(1)-104(n) may be communicatively connected to the core network 106 via a corresponding backhaul 110(1)-110(n). Each of the backhauls 110(1)-110(n) are implemented using copper cables, fiber optic cables, microwave radio transceivers, and/or the like.

The core network 106 also provides telecommunication and data communication services to the user devices 108(1)-108(n). In the present example, the core network connects the user devices 108(1)-108(n) to other telecommunication and data communication networks, such as the Internet 112 and public switched telephone network (PSTN) 114. The core network 106 include one or more servers 116 that implement network components. For example, the network components may include a serving GPRS support node (SGSN) that routes voice calls to and from the PSTN 114, a Gateway GPRS Support Node (GGSN) that handles the routing of data communication between external packet switched networks and the core network 106. The network components may further include a Packet Data Network (PDN) gateway (PGW) that routes data traffic between the GGSN and the Internet 112.

Each of the user devices 108(1)-108(n) is an electronic communication device, including but not limited to, a smartphone, a tablet computer, an embedded computer system, etc. Any electronic device that is capable of using the wireless communication services that are provided by the carrier network 102 may be communicatively linked to the carrier network 102. For example, a user may use a user device 108 to make voice calls, send and receive text messages, and/or download content from the Internet 112. A user device 108 is communicatively connected to the core network 106 via a base station 104. Accordingly, communication traffic between user device 108(1)-108(n) and the core network 106 are handled by wireless interfaces 118(1)-118(n) that connect the user devices 108(1)-108(n) to the base stations 104(1)-104(n).

Each of the user devices 108(1)-108(n) are also capable of connecting to a network, including the Internet, via a wireless network connection other than the carrier network wireless services. As shown, device 108(1) includes a connection to network 120(1), device 108(2) includes a connection to network 120(2), device 108(3) includes a connection to network 120(3), device 108(4) includes a connection to network 120(4), and device 108(n) includes a connection to network 120(n). The wireless connections are made by way of any method known in the art, such as Bluetooth®, WiFi, Mesh, etc. or wired connections.

Each of the user devices 108(1)-108(n) is shown storing an authentication 122(1)-122(n), respectively. The authentication application 122 is an application that performs the client-side operations described herein. The authentication application 122 is described in greater detail, below, with respect to subsequent figures.

Apart from the cellular network 102, FIG. 1 includes an identity service provider (IDP) 124 and one or more service provider servers 126. The IDP 124 performs the IDP operations described herein, and the service provider servers 126 perform the service provider server operations described herein. The service provider servers 126 are callable by any of the user devices 108(1)-108(n) to request access to one or more services provided by the service provider servers 126 by presenting an authentication token with or without an additional POP token to the service provider servers 126. The IDP 124 and the service provider servers 126 are described in greater detail, below, with respect to subsequent figures.

Example Client and Server

Figure 2:
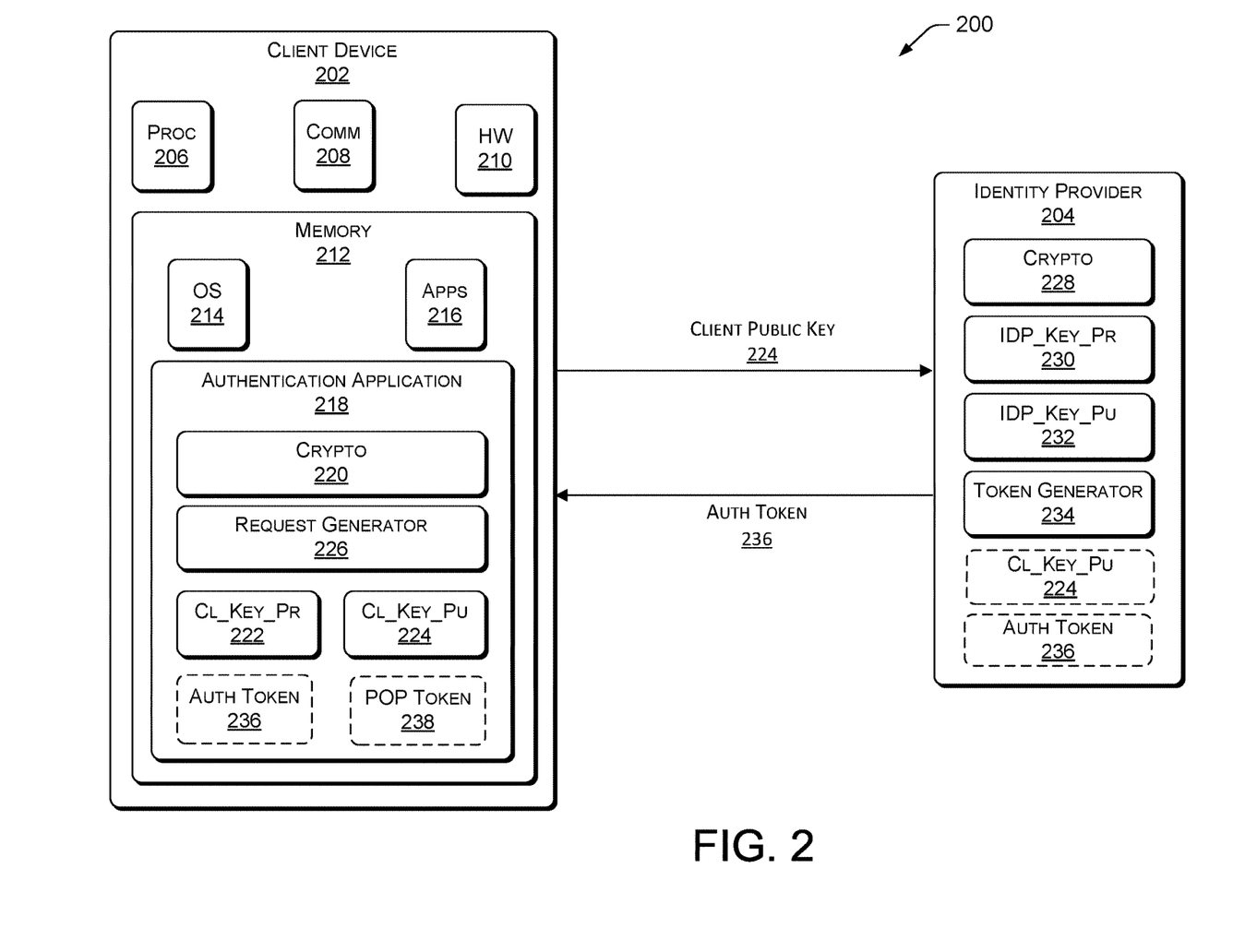
FIG. 2 is a diagram of an example client-server system having a client device and an identity server, and showing interactions to generate an authorization token.

FIG. 2 represents an example client-server system 200 constructed in accordance with at least implementation of the techniques described herein. It is noted that FIG. 2 includes several elements shown with a broken line border. A broken line border indicates that the particular element is not necessarily present at the beginning of one or more operations described herein, but may become available at some point during an operation. In the following description, it is noted when such elements are created or are otherwise available in the example client-server system 200.

The example client-server system 200 includes an example client device 202 and an example identity provider 204. The client device 202 is any processor-based device having the capability to perform the operations described herein, such as a cellular telephone, an electronic tablet, a handheld computing device, a personal computer, and the like. The identity provider 204 is a server hosted by an authentication entity that provides credentials to verified entities, said credentials being usable by an entity to gain access to a secured service that trusts credentials from the identity provider 204. Typically, such a trusted relationship is indicated by a secured service having access to a public key associated with the identity provider 204.

The example client device 202 includes a processor 206 having electronic circuitry that executes instruction code segments by performing basic arithmetic, logical, control, memory, and input/output (I/O) operations specified by the instruction code. The processor 206 can be a product that is commercially available through companies such as Intel® or AMD®, or it can be one that is customized to work with and control and particular system.

The example client device 202 also includes a communications interface 208 and miscellaneous hardware 210. The communication interface 208 facilitates communication with components located outside the example client device 202, and provides networking capabilities for the example client device 202. For example, the example client device 202, by way of the communications interface 208, may exchange data with other electronic devices (e.g., laptops, computers, other servers, etc.) via one or more networks, such as the Internet 112 (FIG. 1) or another network 120 (FIG. 1). Communications between the example client device 202 and other electronic devices may utilize any sort of known communication protocol for sending and receiving data and/or voice communications.

The miscellaneous hardware 210 includes hardware components and associated software and/or or firmware used to carry out client operations. Included in the miscellaneous hardware 202 are one or more user interface hardware components—such as a keyboard, a mouse, a display, a microphone, a camera, and/or the like—that support user interaction with the example client device 202.

The client device 202 also includes memory 212 that stores data, executable instructions, modules, components, data structures, etc. The memory 212 may be implemented using computer readable media, such as computer storage media. Computer-readable media includes at least two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

An operating system 214 is stored in the memory 212. The operating system 214 includes components that enable the example client device 202 to receive and transmit data via various inputs (e.g., user controls, network interfaces, and/or memory devices), as well as process data using the processor 206 to generate output. The operating system 214 can include a presentation component that presents the output (e.g., display the data on an electronic display, store the data in memory, transmit the data to another electronic device, etc.). Additionally, the operating system 206 can include other components that perform various additional functions generally associated with an operating system. The memory 212 also stores various software applications 216, or programs, that can support electronic device functionality or provide a general or specialized device user function that may or may not be related to the electronic client per se.

An authentication application 218 is also stored in the memory 214. The authentication application 218 comprises code segments that are executable on the processor 206 to perform client-side functions described herein. The authentication application 218 is generally able to generate and/or gather relevant data to formulate a request to the identity provider 204 for an authentication token that can be used to access and perform authorized transactions on a secure server.

The authentication application 218 includes a cryptography unit 220 that is configured to create a client private key 222 and a client public key 224, and to create and validate digital signatures. In at least one alternate implementation, the cryptography unit 220 is not a part of the authentication application 218, in which case the client private key 222 and the client public key 224 are obtained from a different source. In such a case, cryptographic operations may also be handled outside the authentication application 218. The authentication application 218 also includes a request generator 226 that is configured to create and transmit requests and tokens as necessary to implement the described techniques.

The identity provider (IDP) 204 includes a IDP cryptography unit 228, an IDP private key 230, an IDP public key 232, and an authentication token generator 234. The IDP cryptography unit 228 includes code segments that are executed to, inter alia, create digital signatures, validate digital signatures, encode, decode, encrypt, and decrypt data transmitted between the client device 202 and the IDP 204. The IDP private key 230 and the IDP public key 232 are keys that are unique to the identify provider 204 and are used for digital signing and/or encryption operations. The authentication token generator 234 is used to create an authentication token that can be used by the client device 202 to access secure servers (not shown). These components will be described in greater detail, below, with respect to operations between the client device 202 and the identity provider 204.

In the following discussion, certain operations are described as being performed by one or more particular elements, sometimes in alternate implementations. It is noted, however, that the operations may be performed by elements other than those to which the operation is presently described, either partially or as a whole. Delineation of specific elements is not intended to limit operations or steps to a particular element.

As a first step in accessing one or more secure services, the client device 202 registers with the identity provider 204 that is trusted by the one or more secure services. Trust is typically established between the one or more secure services and the identity provider 204 by way of a registration process in which a service registers with the identity provider 204 and receives the IDP public key 232. As part of a registration request, the authentication application 218 transmits the client public key 224 to the identity provider 204. In at least one implementation, the request operation is an HTTP (HyperText Transfer Protocol) POST having the client public key 224 encoded in the body of the request. Other information related to the client device 202 and/or a user of the client device 202 may also be included. Such information may include a transaction identifier, an identification of an algorithm used to digitally sign an authentication token, a messaging token, a client identifier, and the like.

The identity provider 204 receives the client public key 224 from the client device 202 and optionally stores the device public key 224 locally. The IDP token generator 234 creates an authentication token 236 that includes the device public key 224 and various other information related to the client device 202 and/or a user thereof. In at least one implementation, the authentication token 236 is a JavaScript Object Notation (JSON) Web Token (JWT). The structure and contents of the authentication token 236 as a JWT is shown and described with respect to FIG. 3.

Example Authentication Token

Figure 3:
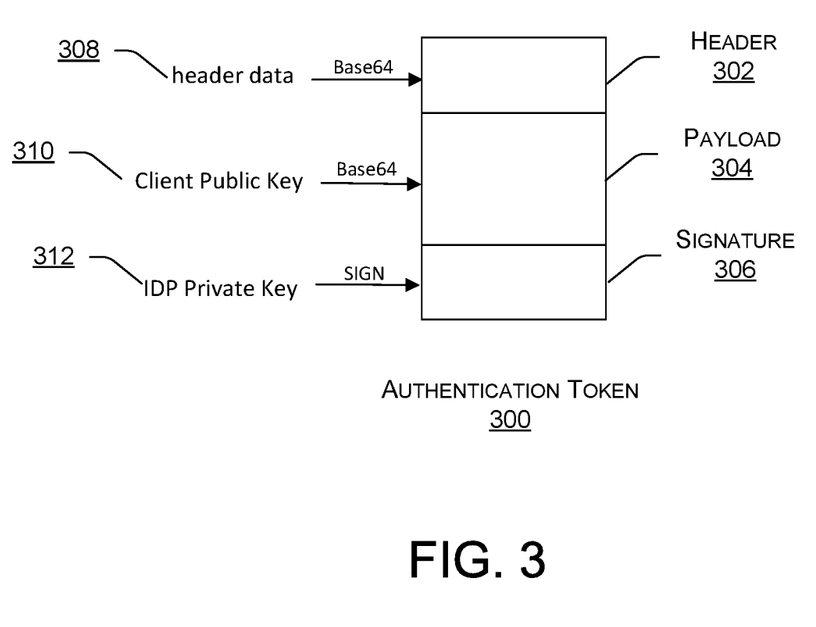
FIG. 3 is a diagram of an example authorization token including a client public key and structured in accordance with the techniques described herein.

FIG. 3 depicts an authentication token 300 according to one or more implementations of the techniques described herein. The authentication token 300 is shown as a data structure having a format of a standard JSON Web Token (JWT), but other formats may be used without departing from the scope of the claims appended hereto. The authentication token 300 includes a header 302, a payload 304, and a signature 306.

The header 302 includes header data 308 that is typically, but not necessarily, made up of two parts: a type of the token, and a digital signing algorithm used with the token (e.g., HMAC SHA256, RSASSA-PSS, etc.). The header data 308 is encoded using Base64, Base64url, or some other mutually recognized scheme to produce the header 302. An example of a header is shown below:

```
b64 ({
    typ: 'JWT'
    alg: 'PS256'
})
```

In this example, the header indicates that the token type is a JSON Web Token, and that the PS256 algorithm was used with the token.

The payload 304 (sometimes referred to as a "body"), includes statements about an entity and may contain additional data. In the example provided, the payload 304 includes at least a client public key 310 (similar to the client public key 228 of FIG. 2) and a unique user identifier (UUID) associated with the client device 202 (FIG. 2). Typically, the payload 304 will also contain other information, such as information that identifies an issuer of the token, a subject of the token, an expiration time of the token, etc. The client public key 310, and other data (if present), is encoded to produce the payload 304. Although such encoding is shown in FIG. 3 as being according to Base64, any known method of encoding may be used as long as it suits the purposes of the techniques described herein. An example of a payload is shown below:

```
b64 ({
"exp" : "84600",
"iat" : "1481699266017",
"iss" : "https://account.t-mobile.com",
"aud" : "mytmo",
"nonce": "NONCE",
"auth_time" : "1481699265",
"at" : "3285.432656yt245462$%3521112m4",
"sub" : "U-96be1cf7-0f9f-450c-bdbe-11d6e12f9926",
"rt":"R5,T2, M2",
"acr" : "loa2",
"amr" : "password",
"cnf": "CLIENTS public KEY",
"enttype":"ABFZ"
"ent" :
"eJyNjjsOwjAQRO8ytQs7WZu1OyiQaLgAcgHBRa
TgSLFdRbk7YEQD4tOsNNo3ozcjhZT6McLNKClM
uzMcckgZi8Cx68YSc4I7zM+wL5dTmG6Q5ZXR1D
YSAuvN9g7FMgyiHpjGKtIGXmDoY6gL75Qiw1La
Bn4RP/6VeHXgrw6PtqGPEIAsFbWWtbTEyjLhT6e
WuDr55QrkPI53"
})
```

In this example, the payload identifies an issuer as "account.t-mobile.com," a UUID as "U-96be1cf7-0f9f-450c-bdbe-11d6e12f9926" and a client public key.

The signature 306 is created by signing the encoded header 302 and the encoded payload 304 with an identity provider private key 312 such as the IDP private key 230 of FIG. 2). The signature 306 is created using the digital signature algorithm identified in the header data 308 (e.g., HMAC SHA256, RSASSA-PSS, etc.). The signature 306 is used to verify that the sender of the token is who it claims it is, and to ensure that the message wasn't changed since originating from the sender.

Referring back to FIG. 2, the identity provider 204 transmits the authentication token 240 to the client device 202, more particularly, to the authentication application 218 of the client device 202. The identity provider 204 may store the authentication token 246 locally prior to transmitting the authentication token 240 to the client device 202. Upon receipt of the authentication token 240, the authentication application 218 stores the authentication token 240 in the memory 212 of the client device 202.

With the elements described thus far, the client device 202 can request access to a secure service by presenting the authorization token 236 to a secure service provider. However, as previously discussed, transmitting the authorization token 236 over a network puts the authorization token 236 at risk of being misappropriated and used by a malicious actor.

To protect against a malicious actor being able to detect and steal an authorization token, the authentication application 218 is also configured to create a POP token 238 that can be used in a request to access a secure service. The POP token 238 can be a JSON Web Token, similar to the authentication token 300 described above with respect to FIG. 3. As discussed below, the POP token 238 can be validated with the client public key 224 that is embedded in the authentication token 236. As a result, a service provider can verify that the entity making a request for access is the same entity to which the authentication token 236 was issued. If the authentication and/or the POP token 238 is stolen, a service provider will not allow a requester to access the service provider. Furthermore, unless a malicious actor steals both the authentication token 300 and the private key, the actor will not be able to use the authentication token 300.

Example Proof-of-Possession (POP) Token

Figure 4:
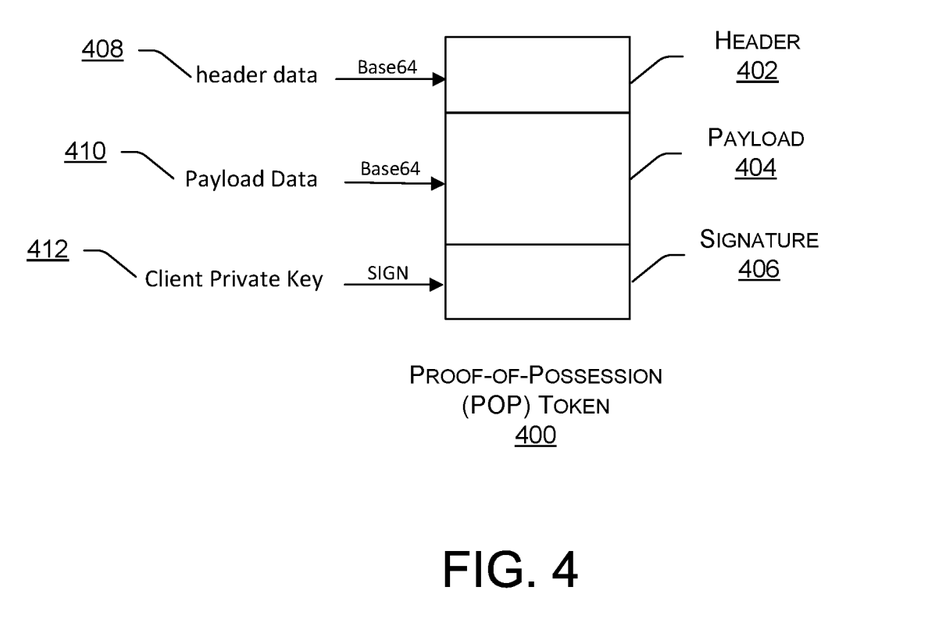
FIG. 4 is a diagram of an example Proof-of-Possession (POP) token including a client public key and structured in accordance with the techniques described herein.

FIG. 4 depicts a proof-of-possession (POP) token 400 according to one or more implementations of the techniques described herein. The POP token 400 is shown as a data structure having a format of a standard JSON Web Token (JWT), but other formats may be used without departing from the scope of the claims appended hereto. The POP token 400 includes a header 402, a payload 404, and a signature 406.

The header 402 includes header data 408 that is typically, but not necessarily, made up of two parts: a type of the token, and a digital signature algorithm used with the token (e.g., HMAC SHA256, RSASSA-PSS, etc.). The header data 408 is encoded using Base64, Base64url, or some other mutually recognized scheme to produce the header 402.

The payload 404 includes payload data 410 that consists of statements about an entity and/or other data, such as information that identifies an issuer of the token, a subject of the token, etc. The payload data 410 is encoded to produce the payload 304. Although such encoding is shown in FIG. 4 as being according to Base64, any known method of encoding may be used as long as it suits the purposes of the techniques described herein.

The signature 406 is created by signing the encoded header 402 and the encoded payload 404 with a client private key 412 such as the client private key 224 of FIG. 2). The signature 406 is created using the digital signature algorithm identified in the header data 408 (e.g., HMAC SHA256, RSASSA-PSS, etc.). The signature 406 is used to verify that the sender of the POP token is the entity to which the authentication token was issued, and to ensure that the message wasn't changed since originating from the sender.

Example Client-Server Interaction

Figure 5:
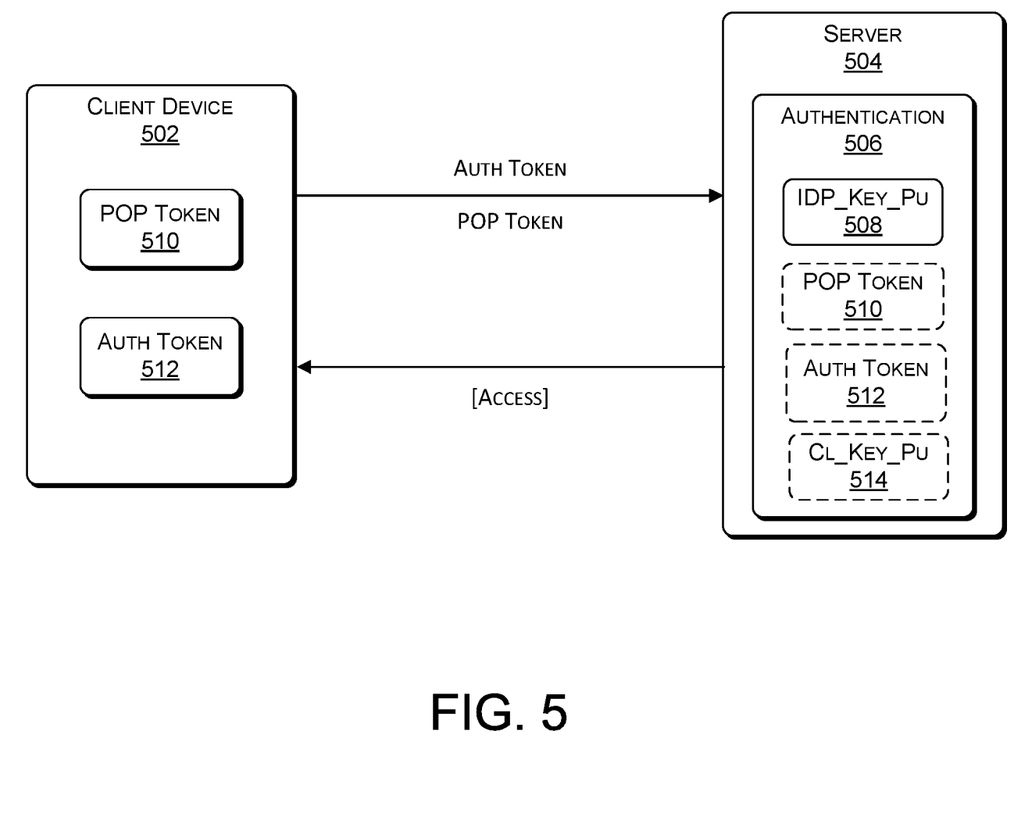
FIG. 5 is a diagram of an example client-server system, showing presentation of a POP token in a request to access a secure server.

FIG. 5 is a depiction of an example client-server system 500 in which an authentication token (similar to authentication token 246 of FIG. 2) may be used. The client-server system 500 includes a client device 502 that is similar to the example electronic device 202 shown and described with respect to FIG. 2. The client-server system 500 also includes a server 504 that is configured to provide authorization and access for a secure service. The server 504 includes an authentication module 506 that has access to a public key 508 of an identity provider (similar to IDP public key 232, FIG. 2).

The client device 502 possesses a POP token 510 structured similarly to the POP token 246 of FIG. 2. The client device 502 also possesses an authentication token 512 similar to the authentication token 236 issued by the IDP 204 (FIG. 2). In an initial operation, the client device 502 provides the POP token 510 and the authentication token 512 in a request to access the server 504. As will be discussed in greater detail, below, the tokens may be included in an HTTP request in at least one implementation. Use of an HTTP request, where the tokens can be included in an authorization header, provides a common and simple method of delivery of the tokens to the server 504. However, alternative methods of delivering the POP token 510 and the authentication token 512 may be used. The server 504 may store local copies of the POP token 510 and the authentication token 512.

Since the server 504 has an existing trust relationship with an identity provider, as indicated by the server's possession of the IDP public key 508, the server 504 uses the IDP public key 508 to validate the authentication token 512 and extract the client public key 514. The authentication module 506 can then use the client public key 514 to validate the POP token 510 that was signed with a private key corresponding to the client public key 514.

The server 504 is thereby able to confirm at least two things: (1) that the client public key 514 was used to obtain the authentication token 512 from an identity provider trusted by the server 504; and (2) that the POP token 510 was not altered since being created by the client device 502. Furthermore, the client private key was not ever transmitted over a network and, therefore, could not be stolen and used by an unauthorized entity to gain access to the server 504.

Example HTTP Request: Client to Server

Figure 6:
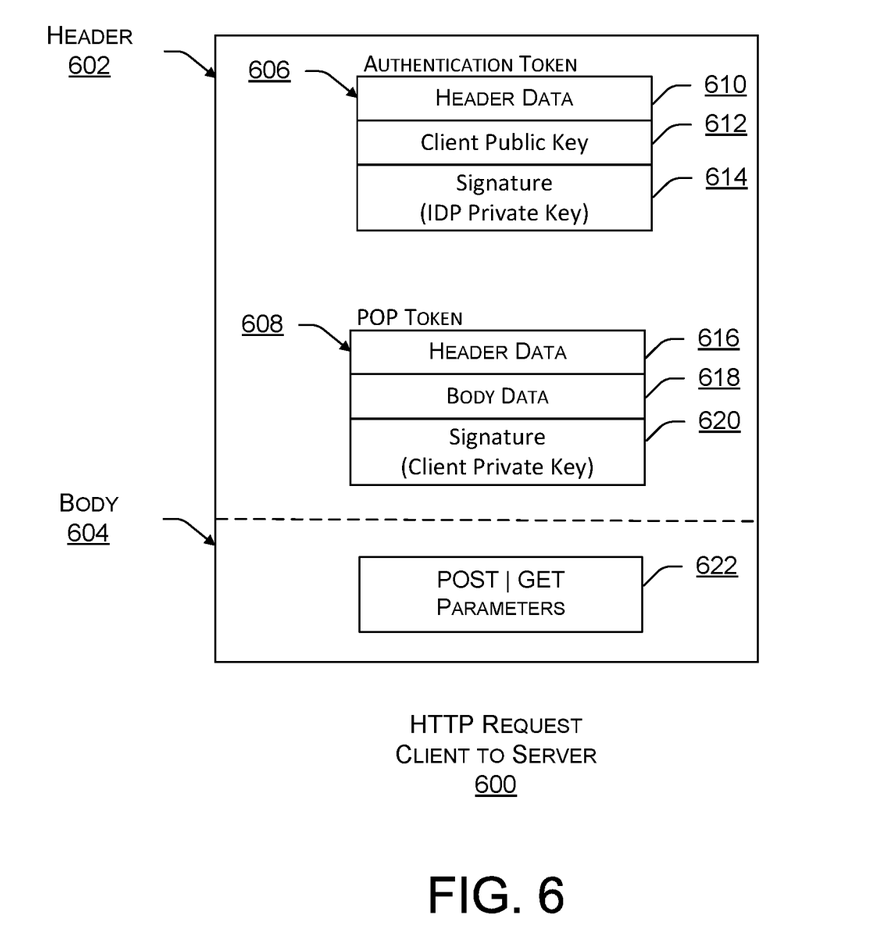
FIG. 6 is a representation of a structure of an HTTP request from a client device to a secure server.

FIG. 6 is a representation of a structure of an HTTP request 600 from a client device to access a secure service provided by a server. The HTTP request 600 includes a header 602 and a body 604. The syntax for an HTTP authorization header is: <type><credentials>, wherein <type> is "Basic," "Bearer," "Digest," "Mutual," or some other recognized type. The <credentials> are identifiers associated with a sender of the request, and typically include a user identifier and a password, but the present techniques relate to a single sign-on (SSO) process that doesn't require a client to include a user id and password in every request to a secure server.

In the present example, an authentication token 606 and a POP token 608 are included in the header 602 credentials. Similar to the authentication token 300 shown in FIG. 3, the authentication token 606 includes header data 610, a client public key 612, and a signature 614 from a trusted identity provider. The POP token is similar to the POP token 400 (FIG. 4) and includes header data 616, body data 618, and a signature 620 created with a client private key (222, FIG. 2). Finally, the HTTP request 600 includes parameters 622 in the body 604 of the request 600.

It is noted that other data may also be included in the HTTP request 600. However, FIG. 6 is meant to indicate one manner in which an authentication token and a POP token may be included in a request for access to a secure service offered by a secure server.

Example Client-Server-Server Interaction

Figure 7:
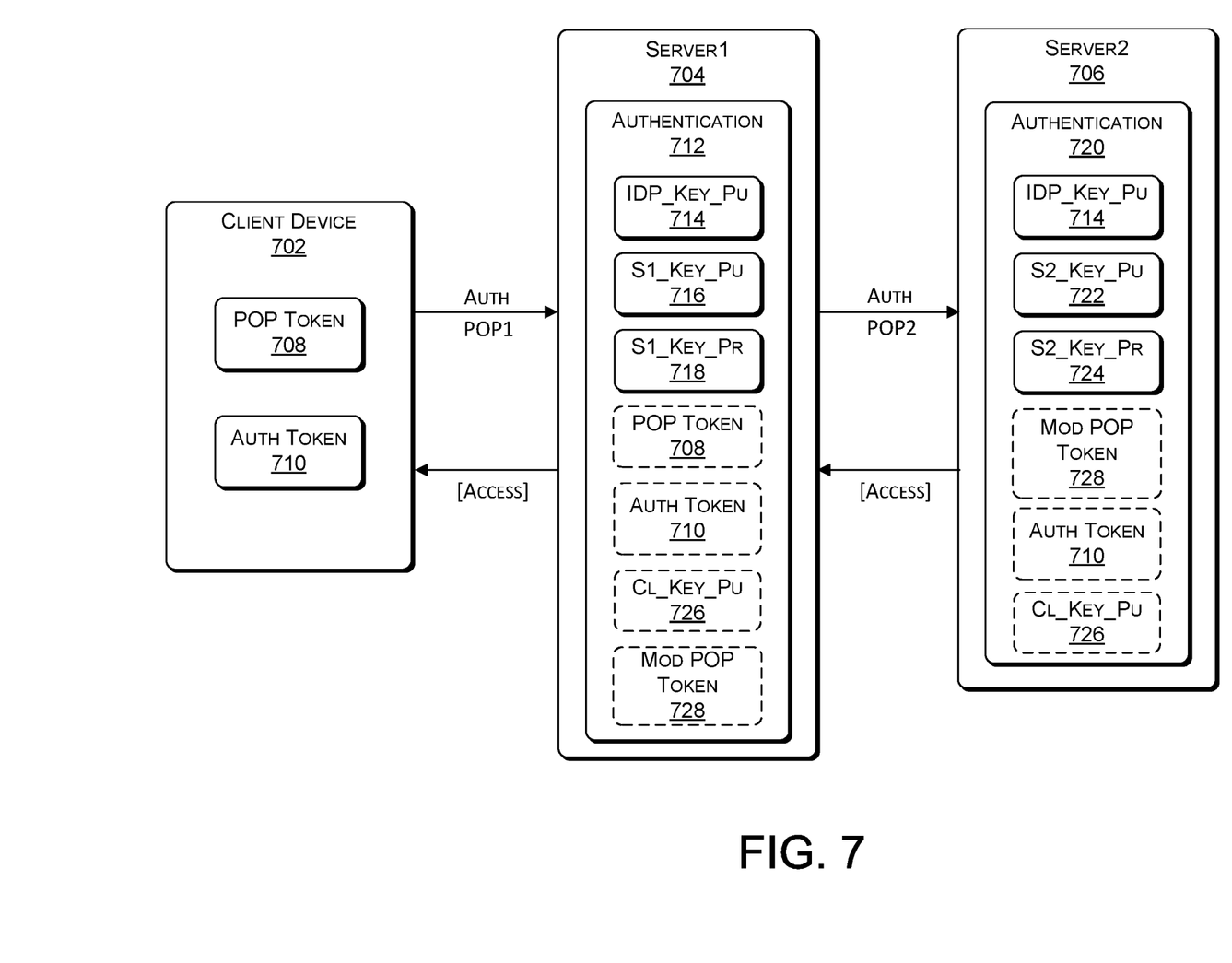
FIG. 7 is a diagram of an example client device, an example first secure server, and an example second secure server, showing presentation and re-presentation of a POP token in a request to the first server and in a subsequent request to the second server.

FIG. 7 is a depiction of an example client-server-server system 700 in which an authentication token (similar to authentication token 246 of FIG. 2) may be used. The client-server-server system 700 depicts how an authentication token may be re-used by a first server in creation of a modified POP token that can be presented to a second server with the authentication token. Such an arrangement is useful when a server that has been accessed by a client needs to access a second server on behalf on the client or on its own behalf. In this way, a client can access a second server—a process which may not be transparent to the client—without the second server having to go through an authentication process or make a call to an identity provider.

The client-server-server system 700 includes a client device 702 that is similar to the example electronic device 202 shown and described with respect to FIG. 2. The client-server-server system 700 also includes Server1 704 and Server2 706, both of which are configured to provide authorization and access for secure services.

The client device 702 possesses a POP token 708 structured similarly to the POP token 246 of FIG. 2. The client device 702 also possesses an authentication token 710 similar to the authentication token 236 issued by the IDP 204 (FIG. 2). Server1 704 includes an authentication module 712 that has access to a public key 714 of an identity provider (similar to IDP public key 232, FIG. 2) with which Server1 704 has established a trusted relationship. Server1 704 also includes a Server1 public key 716 and a corresponding Server1 private key 718.

Server2 706 includes an authentication module 720 that has access to the identity provider public key 714 as a result of a trusted relationship between an identity provider and Server2 706. Server2 704 also has a Server2 public key 722 and a corresponding Server2 private key 724.

Initially, the client device 702 provides the POP token 708 and the authentication token 710 in a request to access the Server1 704. The request can be in the form of an HTTP request (as depicted in FIG. 6), wherein the POP token 708 and the authentication token 710 are included as HTTP authorization headers. However, other means of transmitting the POP token 708 and the authentication token 710 from the client device 702 to Server1 704 may be used. Server1 704 may store local copies of the POP token 708 and the authentication token 710.

Using techniques previously described, the authentication module 712 obtains a client public key 726 from the authentication token 710 and uses the client public key 726 to validate the POP token 708. In the present example, when a scenario arises where Server1 704 needs to access Server2 706 on behalf of the client device 702, the authentication module 712 of Server1 704 can create a an additional POP token 728. The new POP token 728 is generated the same way as previously described for generation of POP token 400 shown and described with respect to FIG. 4. This allows Server1 704 to sign the request it makes to Server2 706.

The new POP token 728 includes data corresponding to Server1 704 and it is signed with the Server1 private key 718. A request is transmitted from Server1 704 to Server2 706. The request includes the authentication token 710 and the new POP token 728. Server2 706 receives the request and stores the authentication token 710 and the new POP token 728. Using techniques previously described, the authentication module 720 of Server2 706 obtains the client public key 726 from the authentication token 710 and stores the client public key 726 locally. The authentication module 720 can then verify the new POP token 728 to confirm that it was created by the requesting entity, Server1 704. It is noted that POP token 708 (i.e. the first POP token) can also be included in this request so that Server2 706 can identify the chain of signed transactions.

Server2 706 can now certify at least two things: (1) that the authentication token 710 was issued to the client device 702 by a trusted ID provider; and (2) that the new POP token 728 was sent by the sending entity identified in the request (Server1 704). Therefore, the chain of requests can be validated, knowing that neither the authentication token 710 nor the POP tokens 728 and 708 have been modified or misused and the client device 702 and the requesting entity, Server1 704) can be trusted.

The authentication token 710 can be re-used and passed to subsequent servers as required. Since each server that receives a request containing the authentication token and a POP token created by a previous server, no calls to identity services need to be made since the requesting entities (device, previous server(s)) can be authenticated from the information received in the request. This saves computing resources and network bandwidth in comparison to currently available techniques.

Other variations of the techniques described above may be used. For example, Server1 704 could pass a request to Server2 706 without modifying the request. In such an instance, Server2 706 receives the POP token 708 and the authentication token 710, and Server2 706 does not have to be aware that Server1 704 was involved. Alternatively, Server1 704 can acquire a different authentication token (not shown) for itself and create a new POP token (not shown) that conceptually covers the POP token 708 and the authentication token 710 as well as the new POP token. This technique, in effect, is nesting a new POP token around the received request.

Example HTTP Request: Server1 to Server2

Figure 8:
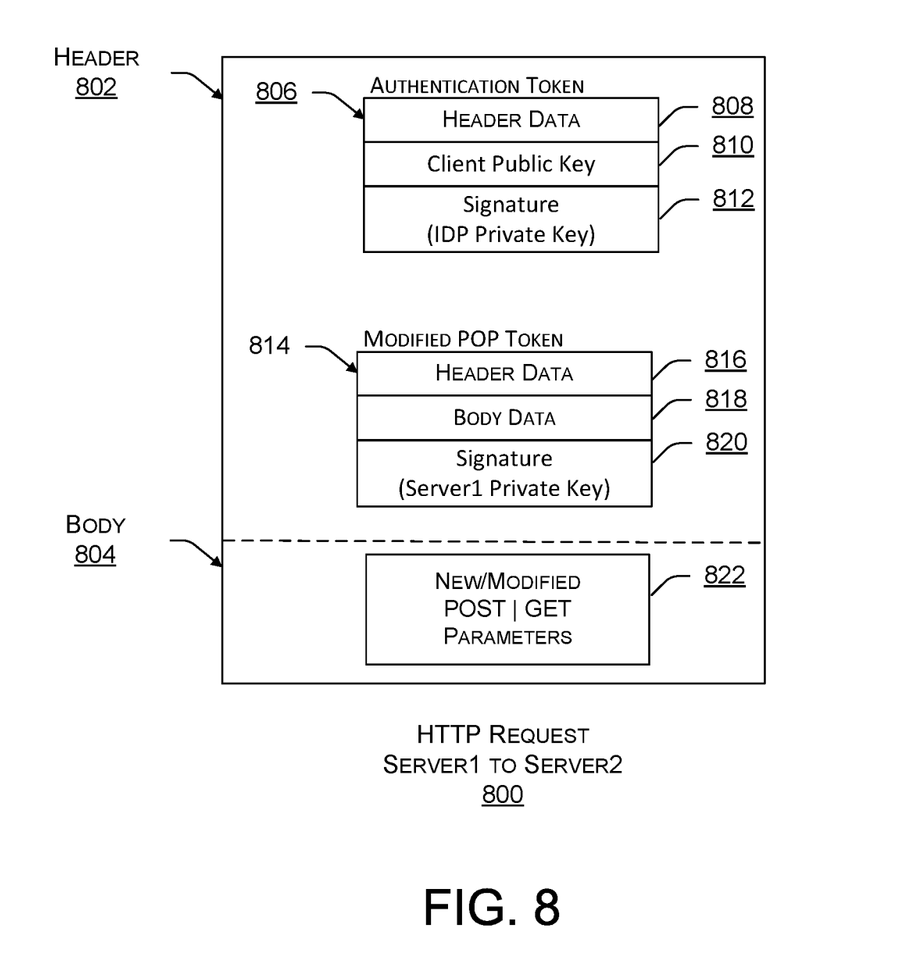
FIG. 8 is a diagram of a structure of an HTTP request from a first server to a second server, the request re-using an authorization token received by the first server from a client device.

FIG. 8 is a representation of a structure of an HTTP request 800 from a first server, Server1, to access a secure service provided by a second server, Server2. The HTTP request 800 includes a header 802 and a body 804. The header 802 includes an authentication token 806 and a POP token 808. Similar to the authentication token 300 shown in FIG. 3, the authentication token 806 includes header data 810, a client public key 812, and a signature 814 from a trusted identity provider. The POP token 808 is similar to POP token 400 (FIG. 4) and includes header data 816, body data 818, and a signature 820 created with a client private key (222, FIG. 2). Finally, the HTTP request 800 includes parameters 822 in the body 804 of the request 800.

It is noted that other data may also be included in the HTTP request 800. However, FIG. 8 is shown to indicate one manner in which an authentication token and a POP token may be included in a request for access from a first server to a second server using a client public key of a client device that has accessed the first server.

Example Methodological Implementation—Client

Figure 9:
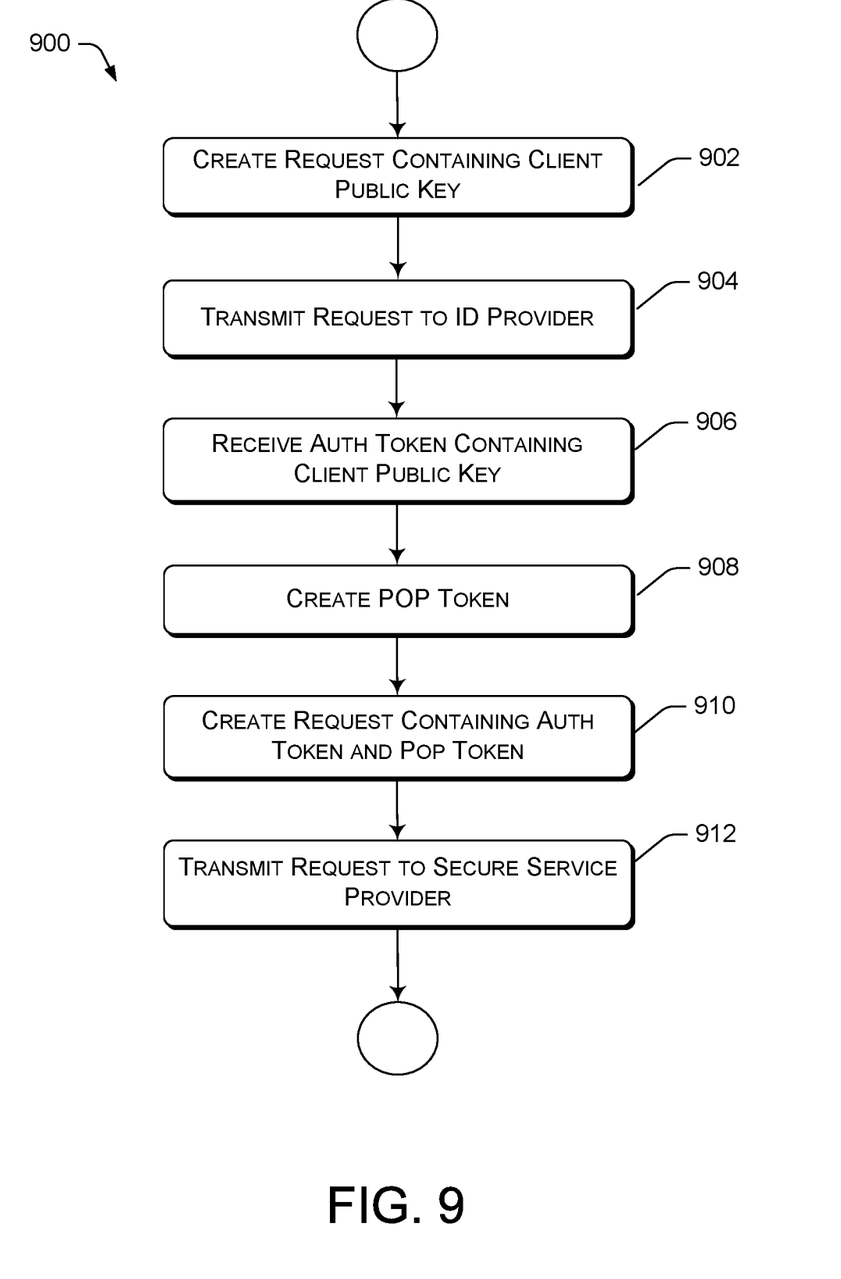
FIG. 9 is a flow diagram of an example client-side methodological implementation for creation and use of an authorization token and a POP token in a request by a client to access a secure server.

FIG. 9 is a flow diagram 900 of an example methodological implementation of client-side operations of a self-contained authentication request method using an authentication token with a client public key and a POP token signed with a client private key. The flow diagram 900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. In the following discussion, reference will be made to elements and reference numerals identified in the discussion of previous figures.

At block 902, the request generator 226 of the authentication application 218 of the client device 202 creates a request to send to the identity provider 204. The request includes the client public key 224. In at least one implementation, the request is an HTTP request and the client public key 224 is includes in an authorization header of the HTTP request. The request is transmitted to the identity provider 204 at block 904.

In response to the request, the client device 202 receives an authentication token 236 from the identity provider. The authentication token 236 contains the client public key 224 embedded within it. The authentication token 236 can be a JSON Web Token (JWT) with the client public key 224 contained in the payload of the JWT.

When the client device 202 is in possession of the authentication token 236, it creates a proof-of-possession (POP) token 238 that is signed with the client public key 224 (block 908). This operation may be done by any component of the client device 202, such as the request generator 226, the authentication application 218, the cryptography module 220, etc. The specific component of the client device 202 that creates the POP token 238 is not significant, and this operation may vary in different implementations.

At block 910, the request generator 226 creates a request that includes the authentication token 236 and the POP token 238. In at least one implementation, the request is an HTTP request that includes the authentication token 236 and the POP token 238 in an authorization header. The request containing the authentication token 236 and the POP token 238 are transmitted to a server (504, FIG. 5) running a secure service at block 912.

Example Methodological Implementation—Server

Figure 10:
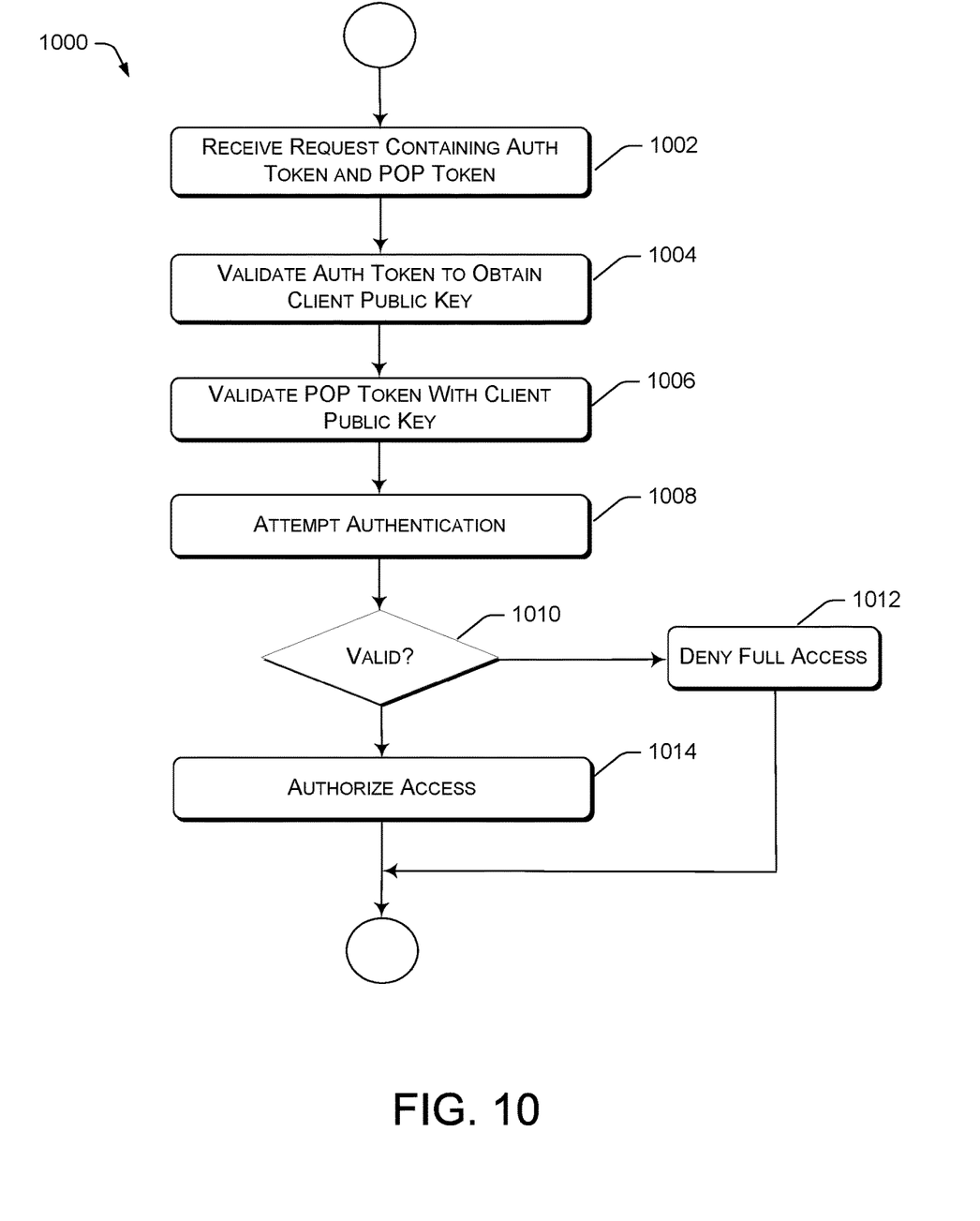
FIG. 10 is a flow diagram of an example server-side methodological implementation for receiving an access request that includes an authorization token and a POP token.

FIG. 10 is a flow diagram 1000 of an example methodological implementation of server-side operations of a self-contained authentication request method using an authentication token with a client public key and a POP token signed with a client private key. The flow diagram 1000 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. In the following discussion, reference will be made to elements and reference numerals identified in the discussion of previous figures.

A server 504 (FIG. 5) running a secure service receives a request to access the secure service from a client device 502 at block 1002. The request includes an authentication token 512 and a POP token 514. In at least one implementation, the request is an HTTP request that includes the authentication token 512 and the POP token 514 in an authorization header, though other request formats may be used. The authentication token 512 is similar in construction to those previously described, and includes a client public key.

At block 1004, the server 504 validates the authentication token 512 with a public key 508 obtained from a trusted identity provider 204 (FIG. 2). As a result, the server 504 has access to the client public key 514 that is included in the authentication token 512. The server 504 uses the client public key 514 to validate the POP token 514 at block 1006. At block 1008, the server 504 attempts to validate that the client device 202 identified in the POP token is the actual requester, and that the authentication token is the token issued by the trusted identity provider 204 to the client device 502.

If one of the tokens cannot be validated ("No" branch, block 1010), then the server 504 either denies access or provides only limited access at block 1012. If both the authentication token 510 and the POP token 512 are valid ("Yes" branch, block 1010), then the server 504 authorizes access to the client device 502 (block 1014).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   receiving a first request to access a secure service, the first request including a first token and a second token;
   extracting a client public key from the first token;
   validating the second token with the client public key extracted from the first token;
   authorizing access to the secure service upon validation of the second token;
   creating a third token signed by a server private key; and
   transmitting to a second server a second request for access to the second server, the second request including the first token and the third token,
   wherein the first token is configured to validate a client device for the access to the second server, and the third token is configured to validate a requesting entity of the second request for access to the second server.

2. The method as recited in claim 1, wherein the second token authenticates a source of the first request.

3. The method as recited in claim 1, wherein the first token is an authentication token created and signed by a trusted identity provider, and wherein the extracting further comprises validating the first token with an identity provider public key to obtain the client public key.

4. The method as recited in claim 1, wherein the first request is a HyperText Transfer Protocol (HTTP) request containing the first token and the second token in an authorization header.

5. The method as recited in claim 1, wherein the authorizing access to the secure service is based on one or both of the first and second tokens without a call to an external service to validate the first request.

6. The method as recited in claim 1, wherein the second server authorizes access by the client device based on validation of at least the first token.

7. One or more non-transitory computer-readable media, containing computer executable instructions, comprising:
   a first code segment that, when executed, receives a first request from a client device to access a secure service, the first request including a first token and a second token;
   a second code segment that, when executed, extracts a client device public key from the first token;
   a third code segment that, when executed, validates the second token using the client device public key extracted from the first token;
   a fourth code segment that, when executed, authorizes access to the secure service upon successful validation of the second token;
   a fifth code segment that, when executed, creates a third token signed with a first server private key; and
   a sixth code segment that, when executed, creates a second request to a second server, the second request including the first token and the third token,
   wherein the third token is configured to be validatable with a first server public key, and the first token is configured to be validatable with an identity provider public key.

8. The one or more non-transitory computer-readable media as recited in claim 7, wherein the client device public key is configured to be extractable from the first token using a public key of an identity provider that created the first token.

9. The one or more non-transitory computer-readable media as recited in claim 7, wherein the first token and the second token are received included in an authorization header of an HTTP request.

10. The one or more non-transitory computer-readable media as recited in claim 7, wherein the first token is a JSON Web Token that stores the client device public key in a digitally signed body of the token.

* * * * *